US012417697B2

(12) United States Patent
Xu et al.

(10) Patent No.: US 12,417,697 B2
(45) Date of Patent: Sep. 16, 2025

(54) METHODS AND SYSTEMS FOR PREDICTING TRAFFIC INFORMATION FOR AT LEAST ONE MAP TILE AREA

(71) Applicant: HERE Global B.V., Eindhoven (NL)

(72) Inventors: Jingwei Xu, Buffalo Grove, IL (US); James Joseph, Chicago, IL (US); Bruce Bernhardt, Wauconda, IL (US); Ian He, Chicago, IL (US); Joe Ciprian, Chicago, IL (US); Weimin Huang, Chicago, IL (US); Yuxin Guan, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 308 days.

(21) Appl. No.: 18/082,350

(22) Filed: Dec. 15, 2022

(65) Prior Publication Data

US 2024/0203246 A1    Jun. 20, 2024

(51) Int. Cl.
*G01C 21/00* (2006.01)
*G08G 1/01* (2006.01)
*G01C 21/34* (2006.01)

(52) U.S. Cl.
CPC ......... *G08G 1/0141* (2013.01); *G08G 1/0125* (2013.01); *G01C 21/3492* (2013.01)

(58) Field of Classification Search
CPC .. G08G 1/0141; G08G 1/0125; G08G 1/0112; G08G 1/0129; G01C 21/3492; G01C 21/00

(Continued)

(56) References Cited

U.S. PATENT DOCUMENTS 7,813,870 B2 * 10/2010 Downs ................... G08G 1/042
340/995.13
10,121,366 B2   11/2018 Feldman et al.
(Continued)

FOREIGN PATENT DOCUMENTS

CN        104317583 A      1/2015

OTHER PUBLICATIONS

Liu et al., "Grid Mapping for Spatial Pattern Analyses of Recurrent Urban Traffic Congestion Based on Taxi GPS Sensing Data", Mar. 31, 2017, 15 pages.

*Primary Examiner* — Shardul D Patel
(74) *Attorney, Agent, or Firm* — DITTHAVONG, STEINER & MLOTKOWSK

(57) ABSTRACT

The disclosure provides a method, a system, and a computer program product for predicting traffic information for at least one map tile area. The method comprises obtaining probe data and map attribute data for each of a plurality of road segments in the at least one map tile area. The method may include generating current traffic condition data for each of the plurality of road segments in the at least one map tile area based on the obtained probe data and the obtained map attribute data. The method may further include obtaining historical traffic pattern data associated with each of the plurality of road segments in the at least one map tile area. The method may further include generating a tile based traffic index (TTI) for the at least one map tile area based on aggregating the current traffic condition data and the historical traffic pattern data of the plurality of road segments in the at least one map tile area and providing TTI and predicting the traffic information for the at least one map tile area based on the generated tile based traffic index (TTI).

18 Claims, 8 Drawing Sheets

(58) Field of Classification Search
USPC .......................................................... 701/450
See application file for complete search history.

(56) References Cited

U.S. PATENT DOCUMENTS

| | | | |
|---|---|---|---|
| 2017/0309171 A1 | 10/2017 | Zhao et al. | |
| 2019/0018426 A1* | 1/2019 | Yao | G05D 1/0212 |
| 2022/0332350 A1* | 10/2022 | Jha | B60W 60/0017 |
| 2022/0340177 A1* | 10/2022 | Khayatian | B60W 60/00 |
| 2023/0206753 A1* | 6/2023 | Xu | G08G 1/052 |
| | | | 701/119 |

* cited by examiner

| Traffic delivery radius | City | | | | | Rural | | | | |
|---|---|---|---|---|---|---|---|---|---|---|
| | FC1 | FC2 | FC3 | FC4 | FC5 | FC1 | FC2 | FC3 | FC4 | FC5 |
| Traffic pattern data volume per tile (#1) | 0.5km | 0.5km | 0.5km | 0.5km | 0.5km | 3km | 2km | 1km | 0.5km | 0.5km |
| Traffic pattern data volume per tile (#2) | 1km | 1km | 1km | 1km | 1km | 4km | 3km | 2km | 1km | 1km |
| Traffic pattern data volume per tile (#3) | 2km | 2km | 2km | 2km | 2km | 5km | 4km | 3km | 2km | 2km |
| Traffic pattern data volume per tile (#4) | 3km | 3km | 3km | 3km | 3km | 6km | 5km | 4km | 3km | 3km |
| Traffic pattern data volume per tile (#5) | 4km | 4km | 4km | 4km | 4km | 7km | 6km | 5km | 4km | 4km |

FIG. 5

METHODS AND SYSTEMS FOR PREDICTING TRAFFIC INFORMATION FOR AT LEAST ONE MAP TILE AREA

TECHNOLOGICAL FIELD

The present disclosure generally relates to routing and navigation applications, and more particularly relates to systems and methods for predicting traffic information for at least one map tile area for routing and navigation applications.

BACKGROUND

Various navigation applications are available to provide assistance, for example directions for driving, walking, or other modes of travel. Web-based and mobile app-based systems offer navigation applications that allow a user to request directions from one point to another. Often, a route traversed or to be traversed by a user encompasses several links or road segments with congestion or traffic on the road segment. The traffic or congestion on roads may be caused by multiple reasons like weather condition like heavy snow or fog, construction on the roads, poor signal timings, traffic incidents, accidents and the like. Oftentimes, the user may end up wasting a lot of time in traffic because of the multiple reasons. Therefore there is a need for a system that can determine real time traffic data and predict the future traffic data with more accuracy.

BRIEF SUMMARY

Accordingly, in order to provide accurate and reliable navigation assistance, it is important to predict traffic information for at least one map tile area. To this end, the data utilized for providing the navigation assistance should provide accuracy in predicting traffic information in a map tile area on a route of travel of the vehicle. Especially, in the context of navigation assistance for autonomous vehicles and semi-autonomous vehicles to avoid inaccurate navigation, it is important that the assistance provided is real-time and accurate. There is a need of a system that may analyze and update the lane level traffic information now or for a particular period of time from now. Additionally, there is a need of a system that not only reports, but also predicts the future traffic conditions for next few hours or next few minutes. Additionally, there is a need of a system that may deliver Traffic data in a map tile area either to vehicle by its on field driving position from backend server or to other customers upon request through internet connected devices. More importantly, in the context of autonomous vehicles, it is of utmost importance that the navigation assistance should predict the traffic information and provide the alternative route to traverse. Accordingly, there is a need to predict traffic information for at least one map tile area to provide reliable navigation assistance. Example embodiments of the present disclosure provide a system, a method, and a computer program product for predict traffic information for at least one map tile area.

Some example embodiments disclosed herein provide a method for predicting traffic information for at least one map tile area. The method comprises obtaining probe data and map attribute data for each of a plurality of road segments in the at least one map tile area. The method may include generating current traffic condition data for each of the plurality of road segments in the at least one map tile area based on the obtained probe data and the obtained map attribute data. The method may further include obtaining historical traffic pattern data associated with each of the plurality of road segments in the at least one map tile area. The method may further include generating a tile based traffic index (TTI) for the at least one map tile area based on aggregating the current traffic condition data and the historical traffic pattern data of the plurality of road segments in the at least one map tile area and providing TTI and predicting the traffic information for the at least one map tile area based on the generated tile based traffic index (TTI).

According to some example embodiments, the method further comprises generating confidence value for the generated TTI for the at least one map tile area based on a segment confidence value obtained from a map database and a real time traffic speed confidence value obtained from the probe data.

According to some example embodiments, the method further comprises the generated traffic information delivery radius is associated with traffic information within a radius of location of the vehicle.

According to some example embodiments, generated traffic information delivery radius is associated with traffic information within a radius of location of a vehicle.

According to some example embodiments, generating the tile based traffic index (TTI) for the at least one map tile area comprises generating a numerical value for each of one or more predefined categories, the one or more predefined categories comprising: a way less traffic category, a less traffic category, a similar traffic category, a more traffic category, and a way more traffic than usual category.

According to some example embodiments, wherein generating the current traffic condition data for each of the plurality of road segments in the at least one map tile area comprises obtaining probe data from a plurality of probe vehicles, wherein the probe data is associated with each of the plurality of road segments in the map tile area. The method further includes obtaining map attribute data from a map database for each of the plurality of road segments in the map tile area and generating, using a traffic engine, the current traffic condition data for each of the plurality of road segments in the map tile area based on the probe data and the map attribute data associated with each of the plurality of road segments in the map tile area.

According to some example embodiments, generating the tile based traffic index (TTI) comprises comparing current traffic condition data with historical traffic pattern data for each of the plurality of road segments. The method further includes generating the tile based traffic index(TTI) based on the comparison of current traffic condition data with historical traffic pattern data for each of the plurality of road segments.

According to some example embodiments, the method further comprising updating the historical traffic pattern data based on the current traffic condition data for each of the plurality of road segments in the at least one map tile area.

According to some example embodiments, the method further comprises updating a map database with the information associated with the TTI.

According to some example embodiments, the method further comprises predicting the traffic information associated with weather data change, traffic and incident change for the at least one map tile area based on generated TTI.

Some example embodiments disclosed herein provide a system for predicting traffic information for the at least one map tile area, the system comprising a memory configured to store computer-executable instructions and one or more processors configured to execute the instructions to obtain probe data and map attribute data for each of a plurality of road segments in the at least one map tile area. The one or more processors are further configured to generate current traffic condition data for each of the plurality of road segments in the at least one map tile area based on the obtained probe data and the obtained map attribute data for each of the plurality of road segments in the at least one map tile area. The one or more processors are further configured to generate current traffic condition data for each of the plurality of road segments in the map tile based on the obtained probe data and the obtained map attribute data for each of the plurality of road segments in the map tile. The one or more processors are further configured to obtain historical traffic pattern data associated with each of the plurality of road segments in the at least one map tile area. The one or more processors are further configured to obtain weather data associated with each of the plurality of road segments in the at least one map tile area. The one or more processors are further configured generate a tile based traffic index (TTI) for the at least one map tile area based on aggregation of the current traffic condition data and the historical traffic pattern data of the plurality of road segments in the at least one map tile area and providing TTI and predict the traffic information for the at least one map tile area based on the generated tile based traffic index (TTI) and obtained weather data.

Some example embodiments disclosed herein provide a computer programmable product comprising a non-transitory computer readable medium having stored thereon computer executable instruction which when executed by one or more processors, cause the one or more processors to carry out operations for predicting traffic information for a map tile, the operations comprising obtaining probe data and map attribute data for each of a plurality of road segments in the at least one map tile area. The operations further comprise generating current traffic condition data for each of the plurality of road segments in the at least one map tile area based on the obtained probe data and the obtained map attribute data for each of the plurality of road segments in the at least one map tile area. The operations further comprise obtaining historical traffic pattern data associated with each of the plurality of road segments in the at least one map tile area. The operations further comprise generating a tile based traffic index (TTI) based on aggregating the current traffic condition data and the historical traffic pattern data of the plurality of road segments in the at least one map tile area. The operations further comprise providing TTI and predicting the traffic information for the at least one map tile area based on the generated tile based traffic index (TTI).

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
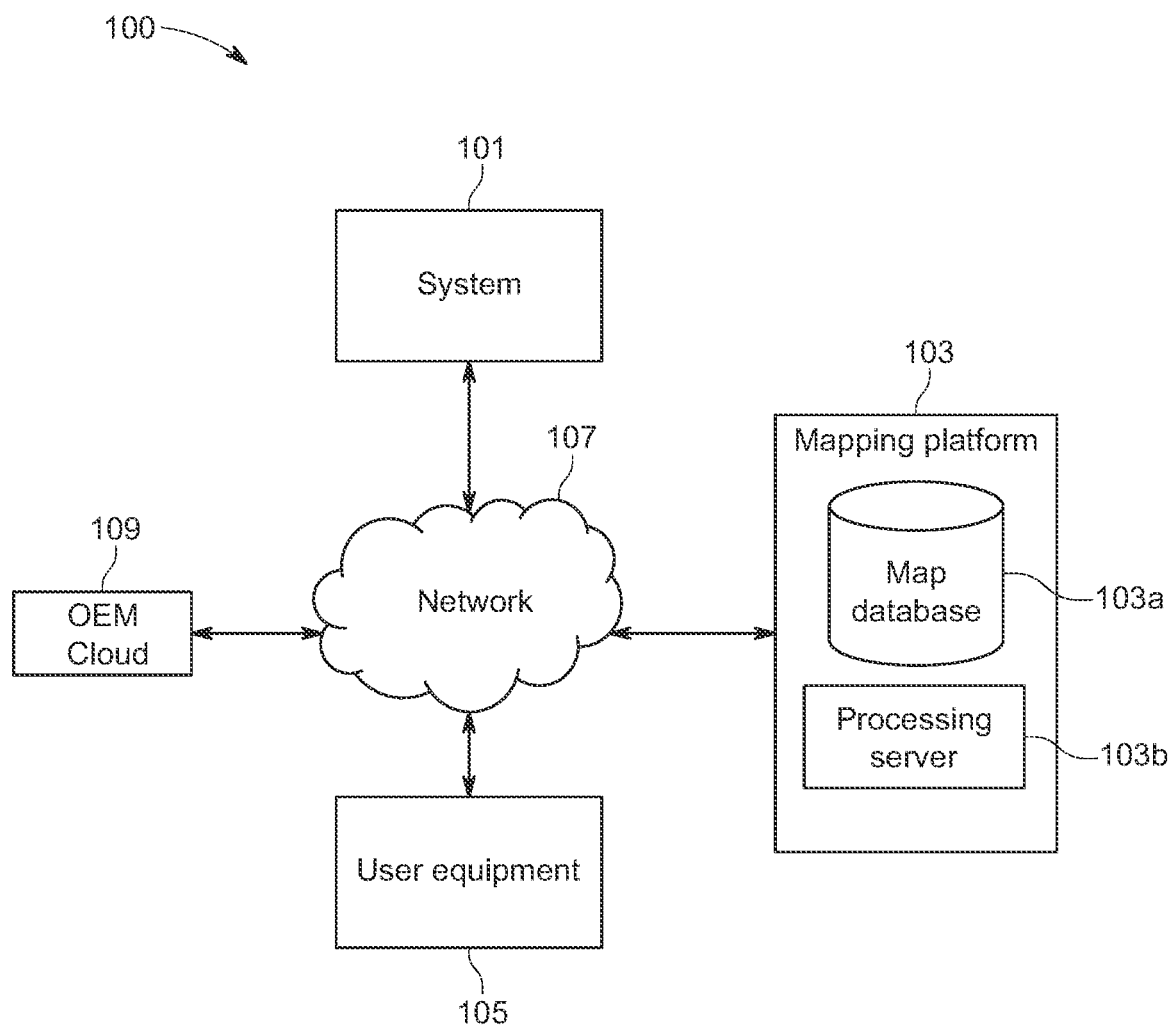
Figure 2:
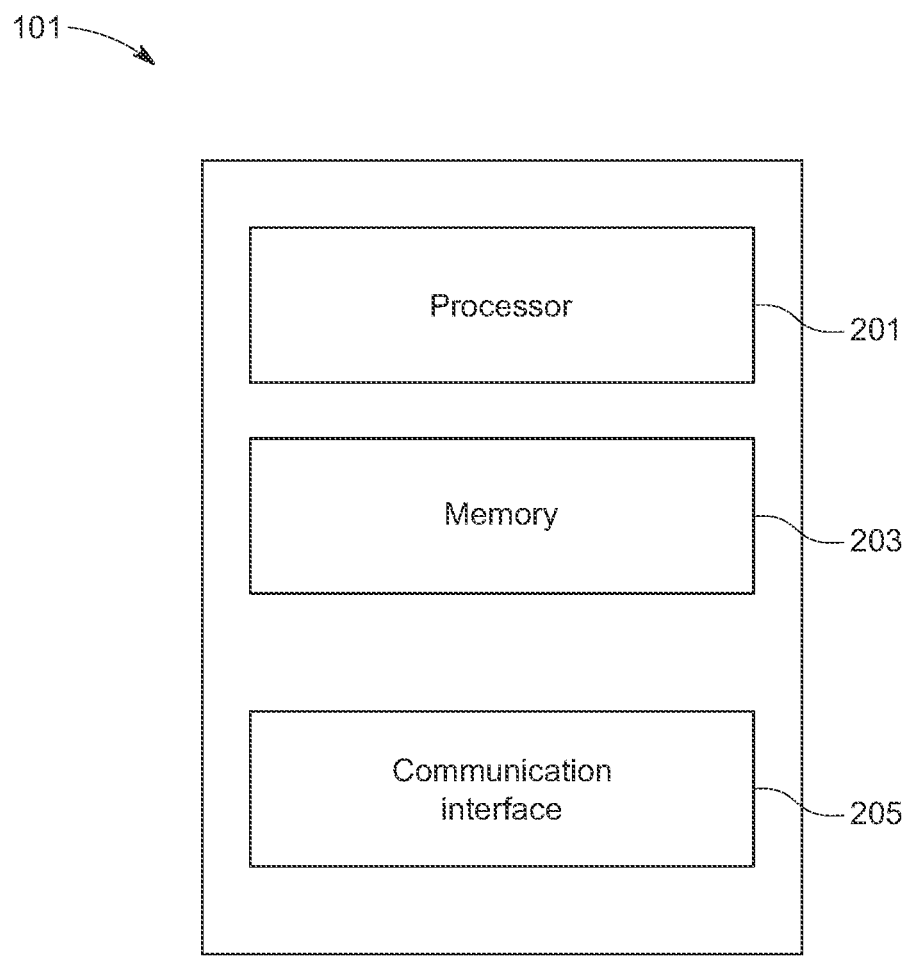
Figure 3A:
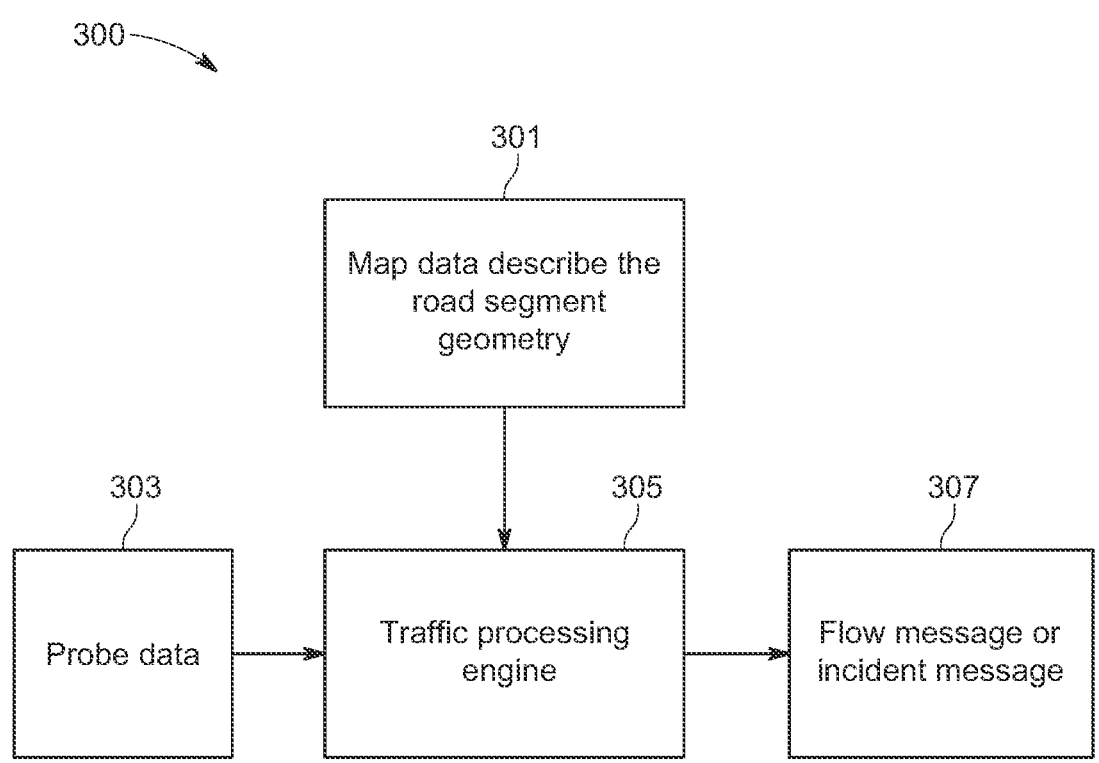
Figure 3B:
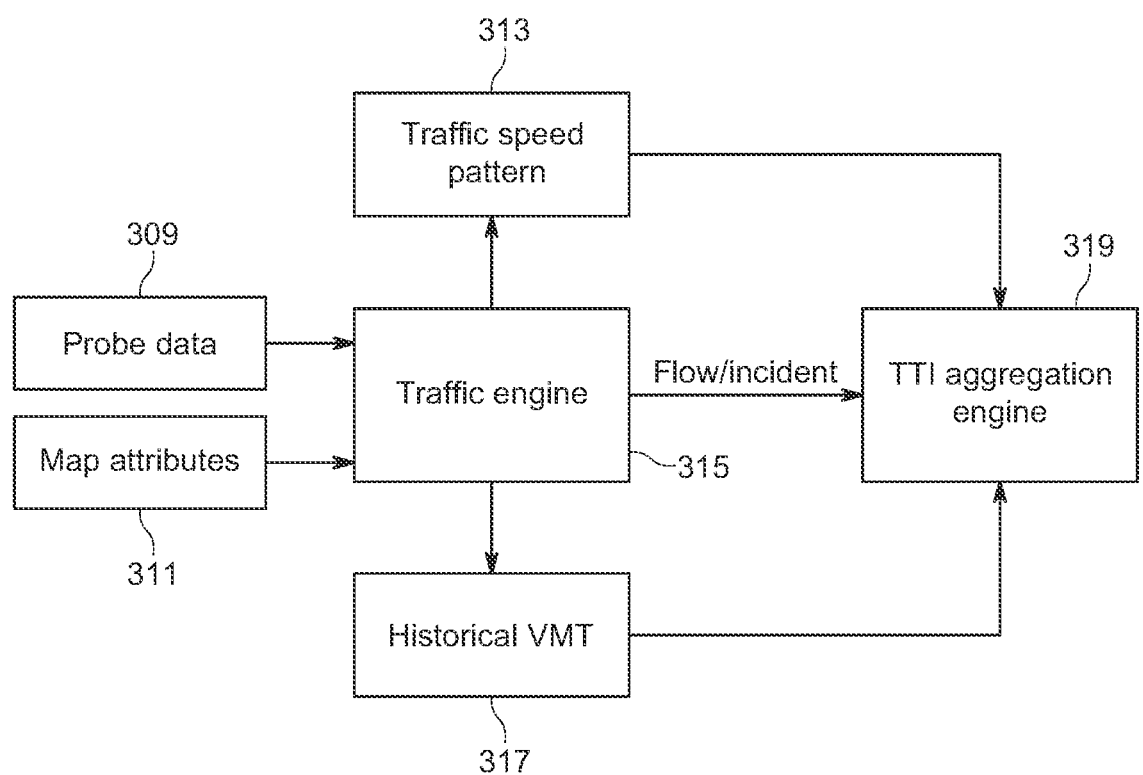
Figure 4A:
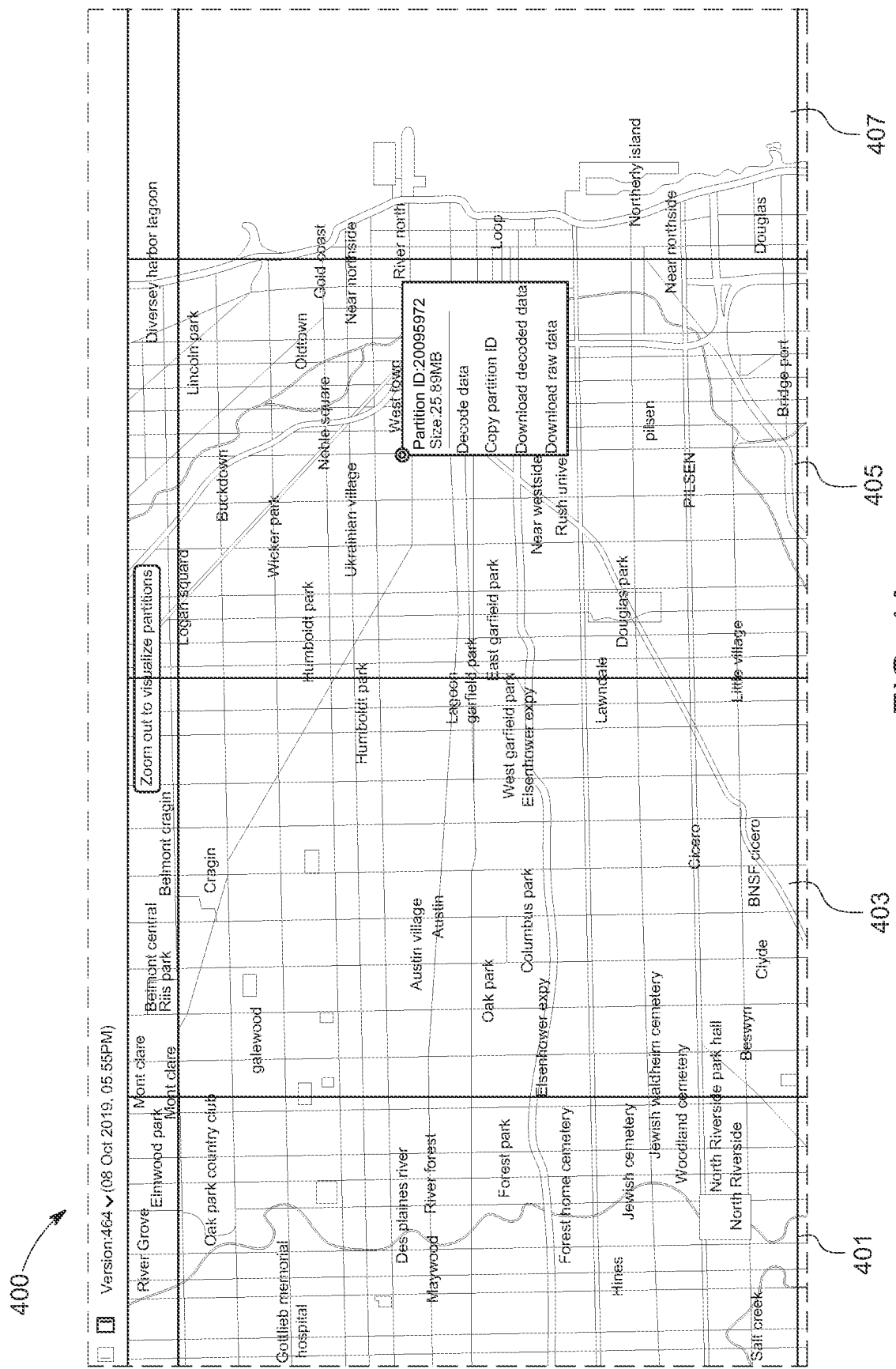
Figure 4B:
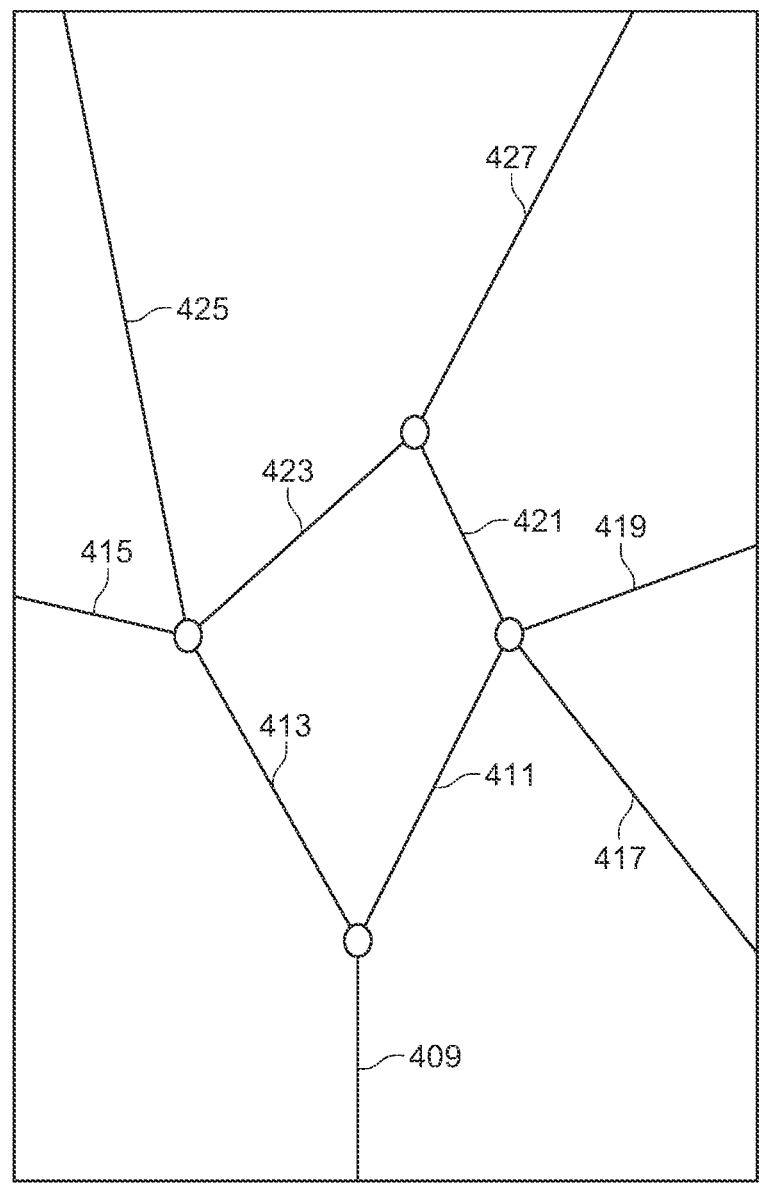
Figure 6:
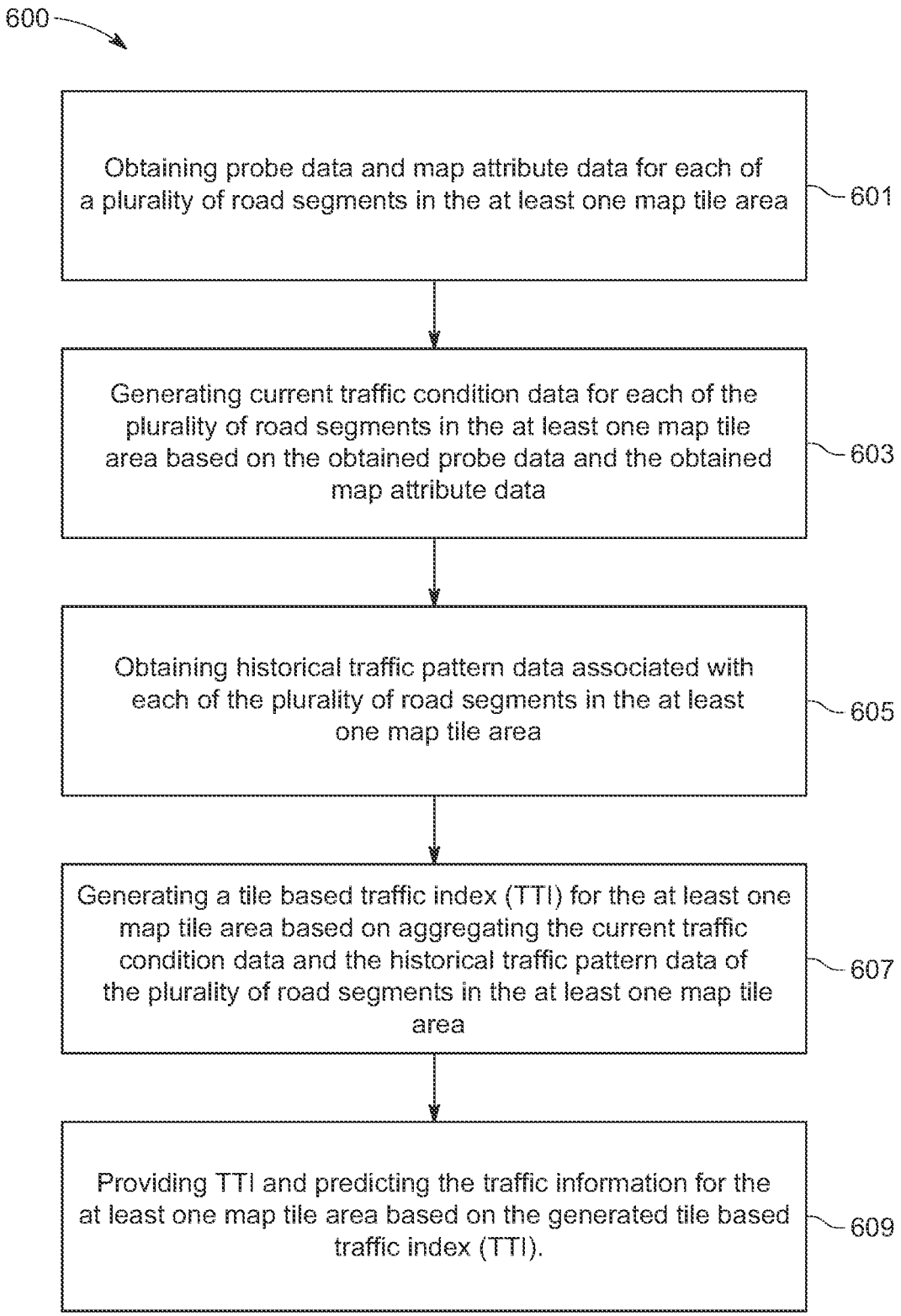

Having thus described example embodiments of the invention in general terms, reference will now be made to the accompanying drawings, which are not necessarily drawn to scale, and wherein:

FIG. 1 illustrates a schematic diagram of a network environment of a system for predicting traffic information for at least one map tile area, in accordance with an example embodiment:

FIG. 2 illustrates a block diagram of a system for system for predicting traffic information for at least one map tile area, in accordance with an example embodiment:

FIGS. 3A-3B illustrates a flow chart of operations performed by the system to generate current traffic condition data and Tile Based Traffic Index(TTI), in accordance with an example embodiment:

FIGS. 4A-4B illustrates a map area for predicting traffic information for at least one map tile area, in accordance with one or more example embodiments:

FIG. 5 illustrates an exemplary representation of traffic information delivery radius generated by the system, in accordance with an example embodiment, and FIG. 6 illustrates a flow diagram of a method for predicting traffic information for at least one map tile area, in accordance with an example embodiment

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein: rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry): (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term "circuitry" also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "route" may be used to refer to a path from a source location to a destination location on any link.

The term "Vehicle Miles Travelled" (VMT) may refer to measurement of the total amount of travel for all vehicles in a geographic region over a given period of time.

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

The term "traffic condition" may refer to traffic or congestion on a road segment in a geographical region.

End of Definitions

Embodiments of the present disclosure may provide a system, a method and a computer program product for predicting traffic information for at least one map tile area. A vehicle travelling on a road segment may encompass issues of traffic or congestion on the road segment. The congestion may be for short period of time and for longer duration of time depending upon the reason of the congestion. Some of the reason for traffic on a road segment may be due to weather conditions, due to work zones, due to accidents and the like. Therefore there is need to predict the traffic information in a map tile area to improve the navigational assistance based on Tile based traffic index(TTI). Additionally, there is a need to provide users or autonomous cars with the information needed to decide when to slow down, when they need to change lanes, and when they need to consider an alternate route. These and other technical improvements of the invention will become evident from the description provided herein.

The system, the method, and the computer program product facilitating for predicting traffic information for at least one map tile area are described with reference to FIG. 1 to FIG. 6.

FIG. 1 illustrates a schematic diagram of a network environment 100 of a system 101 for predicting traffic information for at least one map tile area, in accordance with an example embodiment. The system 101 may be communicatively coupled to a mapping platform 103, a user equipment 105 and an OEM (Original Equipment Manufacturer) cloud 109 connected via a network 107. The components described in the network environment 100 may be further broken down into more than one component such as one or more sensors or application in user equipment and/or combined together in any suitable arrangement. Further, it is possible that one or more components may be rearranged, changed, added, and/or removed.

In an example embodiment, the system 101 may be embodied in one or more of several ways as per the required implementation. For example, the system 101 may be embodied as a cloud based service or a cloud based platform. As such, the system 101 may be configured to operate outside the user equipment 105. However, in some example embodiments, the system 101 may be embodied within the user equipment, for example as a part of an in-vehicle navigation system. In each of such embodiments, the system 101 may be communicatively coupled to the components shown in FIG. 1 to carry out the desired operations and wherever required modifications may be possible within the scope of the present disclosure. In various embodiments, the system 101 may be a backend server, a remotely located server, or the like. In an embodiment, the system 101 may be the server 103b of the mapping platform 103 and therefore may be co-located with or within the mapping platform 103. The system 101 may be implemented in a vehicle, where the vehicle may be an autonomous vehicle, a semi-autonomous vehicle, or a manually driven vehicle. Further, in one embodiment, the system 101 may be a standalone unit configured for predicting traffic information for at least one map tile area. Alternatively, the system 101 may be coupled with an external device such as the autonomous vehicle.

The mapping platform 103 may comprise a map database 103a for storing map data and a processing server 103b. The map database 103a may store node data, road segment data, link data, point of interest (POI) data, link identification information, heading value records, or the like. Also, the map database 103a further includes speed limit data of each lane, cartographic data, routing data, and/or maneuvering data. Additionally, the map database 103a may be updated dynamically to cumulate real time traffic conditions. The real time traffic conditions may be collected by analyzing the location transmitted to the mapping platform 103 by a large number of road users through the respective user devices of the road users. In one example, by calculating the speed of the road users along a length of road, the mapping platform 103 may generate a live traffic map, which is stored in the map database 103a in the form of real time traffic conditions. In one embodiment, the map database 103a may further store historical traffic data that includes travel times, average speeds and probe counts on each road or area at any given time of the day and any day of the year. In an embodiment, the map database 103a may store the probe data over a period of time for a vehicle to be at a link or road at a specific time. The probe data may be collected by one or more devices in the vehicle such as one or more sensors or image capturing devices or mobile devices. In an embodiment, the probe data may also be captured from connected-car sensors, smartphones, personal navigation devices, fixed road sensors, smart-enabled commercial vehicles, and expert monitors observing accidents and construction. In an embodiment, the map database 103a may store the historical VMT (Vehicle mileage travelled). The VMT measures the total amount of travel for all vehicles in a map tile area over a given period of time In an embodiment, the stored historical data in the map database 103a may provide typical traffic pattern for a specific time point during the week in a map tile area. In an embodiment, the map tile area may comprise plurality of road segments or links in it. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network used by vehicles such as cars, trucks, buses, motorcycles, and/or other entities. Optionally, the map database 103a may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 103a may also store data about the POIs and their respective locations in the POI records. The map database 103a may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103a may include event data (e.g., traffic incidents, construction activities, scheduled events, unscheduled events, accidents, diversions etc.) associated with the POI data records or other records of the map database 103a associated with the mapping platform 103. Optionally, the map database 103a may contain path segment and node data records or other data that may represent pedestrian paths or areas in addition to or instead of the autonomous vehicle road record data.

The map database 103a may be maintained by a content provider e.g., a map developer. By way of example, the map developer may collect geographic data to generate and enhance the map database 103a. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used to generate map geometries directly or through machine learning as described herein.

In some embodiments, the map database 103a may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 105. The navigation-related functions may correspond to vehicle navigation, pedestrian navigation or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the map database 103a may be a master geographic database, but in alternate embodiments, the map database 103a may be embodied as a client-side map database and may represent a compiled navigation database that may be used in or with end user equipment such as the user equipment 105 to provide navigation and/or map-related functions. For example, the map database 103a may be used with the user equipment 105 to provide an end user with navigation features. In such a case, the map database 103a may be downloaded or stored locally (cached) on the user equipment 105.

The processing server 103b may comprise processing means and communication means. For example, the processing means may comprise one or more processors configured to process requests received from the user equipment 105. The processing means may fetch map data from the map database 103a and transmit the same to the user equipment 105 via OEM cloud 109 in a format suitable for use by the user equipment 105. In one or more example embodiments, the mapping platform 103 may periodically communicate with the user equipment 105 via the processing server 103b to update a local cache of the map data stored on the user equipment. Accordingly, in some example embodiments, the map data may also be stored on the user equipment and may be updated based on periodic communication with the mapping platform 103.

In some example embodiments, the user equipment 105 may be any user accessible device such as a mobile phone, a smartphone, a portable computer, and the like that are portable in themselves or as a part of another portable/mobile object such as a vehicle. The user equipment 105 may comprise a processor, a memory and a communication interface. The processor, the memory and the communication interface may be communicatively coupled to each other. In some example embodiments, the user equipment 105 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example embodiments, the user equipment 105 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 105. Additional, different, or fewer components may be provided. For example, the user equipment 105 may be configured to execute and run mobile applications such as a messaging application, a browser application, a navigation application, and the like. In one embodiment, at least one user equipment such as the user equipment 105 may be directly coupled to the system 101 via the network 107. For example, the user equipment 105 may be a dedicated vehicle (or a part thereof) for gathering data for development of the map data in the database 103*a*. In some example embodiments, at least one user equipment such as the user equipment 105 may be coupled to the system 101 via the OEM cloud 109 and the network 107. For example, the user equipment 105 may be a consumer vehicle (or a part thereof) and may be a beneficiary of the services provided by the system 101. In some example embodiments, the user equipment 105 may serve the dual purpose of a data gatherer and a beneficiary device. The user equipment 105 may be configured to capture sensor data associated with a road which the user equipment 105 may be traversing. The sensor data may for example be image data of road objects, road signs, or the surroundings (for example buildings). The sensor data may refer to sensor data collected from a sensor unit in the user equipment 105. In accordance with an embodiment, the sensor data may refer to the data captured by the vehicle using sensors.

The network 107 may be wired, wireless, or any combination of wired and wireless communication networks, such as cellular, Wi-Fi, internet, local area networks, or the like. In one embodiment, the network 107 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 6G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an embodiment the network 107 is coupled directly or indirectly to the user equipment 105 via OEM cloud 109. In an example embodiment, the system may be integrated in the user equipment 105. In an example, the mapping platform 103 may be integrated into a single platform to provide a suite of mapping and navigation related applications for OEM devices, such as the user devices and the system 101. The system 101 may be configured to communicate with the mapping platform 103 over the network 107. Thus, the mapping platform 103 may enable provision of cloud-based services for the system 101, such as, storing the lane marking observations in the OEM cloud 109 in batches or in real-time.

FIG. 2 illustrates a block diagram of a system 101 for predicting traffic information for at least one map tile area, in accordance with an example embodiment. The system 101 may include a processing means such as at least one processor 201 (hereinafter, also referred to as "processor 201"), storage means such as at least one memory 203 (hereinafter, also referred to as "memory 203"), and a communication means such as at least one communication interface 205 (hereinafter, also referred to as "communication interface 205"). The processor 201 may retrieve computer program code instructions that may be stored in the memory 203 for execution of the computer program code instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

In some embodiments, the processor 201 may be configured to provide Internet-of-Things (IOT) related capabilities to users of the system 101, where the users may be a traveler, a rider, a pedestrian, and the like. In some embodiments, the users may be or correspond to an autonomous or a semi-autonomous vehicle. The IoT related capabilities may in turn be used to provide smart navigation solutions by providing real time updates to the users to take pro-active decision on turn-maneuvers, lane changes, overtaking, merging and the like, big data analysis, and sensor-based data collection by using the cloud based mapping system for providing navigation recommendation services to the users. The system 101 may be accessed using the communication interface 205. The communication interface 205 may provide an interface for accessing various features and data stored in the system 101.

Additionally or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

The communication interface 205 may comprise input interface and output interface for supporting communications to and from the user equipment 105 or any other component with which the system 101 may communicate. The communication interface 205 may be any means such as a device or circuitry embodied in either hardware or a combination of hardware and software that is configured to receive and/or transmit data to/from a communications device in communication with the user equipment 105. In this regard, the communication interface 205 may include, for example, an antenna (or multiple antennae) and supporting hardware and/or software for enabling communications with a wireless communication network. Additionally or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms.

FIG. 3A-3B illustrates a flow chart of operations performed by the system 101 to generate current traffic condition data and Tile based Traffic Index (TTI), in accordance with an example embodiment. Starting at block 301, the system 101 may be configured to obtain map attribute data for each of a plurality of road segments in the at least one map tile area (Hereinafter, at least one map tile area may also be referred to as map area or map tile) from the map database 103a. In an example embodiment, the obtained map attributes may include map data related to all the road segments in a particular map tile area. The map data may include but not limited to, all the speed signs, locations and value of speed signs, point of interest (POI), region of interest (ROI), and Historical data associated with each of the road segment in the map tile area.

At block 303, the system 101 may be configured to obtain probe data from plurality of probe vehicles for each road segment in the map tile area. In an embodiment, the probe data consists of a location, time, direction of travel and speed with which a vehicle is travelling on a road segment. In an embodiment, the probe data may also give information that how much time a vehicle is spending or waiting on a particular road segment. If there is congestion, the vehicle may spend more than the usual time on a particular road segment and if there is no congestion, the vehicle may not take much time on a particular road segment. The system 101 may obtain the probe data collected from multiple resources such as, but not limited to, mobile devices, or one or more sensors or GPS installed in the vehicle or mobile device.

At block 305, the system 101 may be configured to ingest the obtained probe data and map attributes in a traffic processing engine. The system 101 may perform steps such as map matching, pathing, etc. on the received probe data to determine the links or road segments associated with the vehicle. The system 101 may determine the information associated with the road segment or links on which the probe data was captured by the vehicle and may provide traffic information associated with the road segment. At block 307, the system 101 may output flow information or incident messages through the traffic processing engine. The incident message may give estimate of the current travel speed for each of the road segment in the map area. The estimated value may tell if the current traffic condition data on the road segment is congested traffic or free flow based on the speed with which the vehicles are travelling on it. For example, the speed on the road segment is less when traffic on the road segment is more. In an embodiment, the current traffic condition data on each of the plurality of road segments is updated dynamically in the map database 103a. In an embodiment, the system 101 may provide minute-by-minute updates to map database 103a about where congestion is happening or which road segment is free.

In FIG. 3B, at block 309 (which is similar to the block 303), the system 101 may be configured to receive map data or map attributes associated with each road segment in the map area from the map database 103a. At block 311(which is similar to the block 303), the system 101 may be configured to obtain probe data for each road segment in the map area. At block 315, the system 101 performs steps such as map matching, pathing, etc. on the received probe data and map attribute data using a traffic process engine and generates a current traffic condition or real time traffic condition on the each road segment of the map area. At block 313, based on the current traffic condition data generated using traffic processing engine, the system 101 may generate a traffic speed pattern that is followed by the vehicles on each of the plurality of road segments in the map tile and store it in map database 103a as historical data. In an embodiment, the current traffic condition data may be updated in the map database 103a and is stored as historical data.

At block 317, based on the current traffic condition data generated using traffic processing engine, the system 101 may also generate historical data. In an embodiment, the historical data corresponding to road traffic conditions that may be analyzed while considering the variance of different inputs like weather, holidays, rush/non rush hour, number of lanes and the like. In an embodiment, the system 101 may also obtain the historical information by continuously accumulating the vehicle driving path information on each road segment and may be used as the weight for the tile traffic information aggregation in the designated area could be tile or radius, or region.

At block 319, the system 101 may compare the current traffic condition in the map tile with a historical traffic condition of the map tile to check the alignment of current traffic condition data with historical data. The system 101 may further aggregate the current traffic condition data and the historical traffic pattern data for each of the plurality of road segments in the map tile to generate traffic index for a tile. The aggregation of the current traffic condition data and the historical traffic pattern data for each of the plurality of road segments in the map tile is shown as $$\frac{\Sigma(VMT \text{ Per Segment} * (\text{Road Segment Speed/Traffic Pattern Speed})}{\Sigma(VMT \text{ Per Segment})} \quad (1)$$

where, VMT is vehicle mileage travelled, Road Segment Speed is current traffic condition for a specific road segment, such as TMC, link, . . . e.tc and Traffic Pattern Speed is historical traffic pattern speed on the segment. And the system 101 may further generate tile based traffic index based on the aggregated value of the current traffic condition data and the historical traffic pattern data for each of the plurality of road segments in the map tile using TTI aggregation engine. In an embodiment, the system 101 may categorize the TTI aggregated value and generate a numerical value for each of one or more predefined categories of current traffic condition data. The generated numerical value may be categorized into five values [−2, −1, 0, 1, 2] for each of one or more predefined categories of current traffic condition data. For example, the traffic is way more traffic than usual traffic if the TTI aggregated value is −2, the traffic is more than usual traffic if the TTI aggregated value is −1, the traffic is usual traffic if the TTI aggregated value is 0, the traffic is less than usual traffic if the aggregated value is 1, and the traffic is way less than usual traffic if the aggregated value is 2.

The system 101 may further generate confidence value for the generated TTI for the at least one map tile area based on a segment confidence value obtained from a map database and a real time traffic speed confidence value obtained from the probe data. In this way the system 101 may determine and predict the traffic information or congestion in a map tile area based on the TTI value. For example, if a user need to get to a location at 17:00, then the user can plan for the optimal time to leave the office later, all before you've finished your morning tea. And if the forecast changes, the system 101 may send an alert, so you can adjust your departure time, and get there in plenty of time. In FIG. 4 is shown a geographical region divided into plurality of map tile areas and plurality of road segments in one map tile area.

FIG. 4A-4B illustrates a map area 400 for predicting traffic information for at least one map tile area, in accordance with one or more example embodiments. In an embodiment, the geographical region is divided into multiple map tiles. For example, the geographical area 400 is divided into plurality of grids or map tiles such as map tile 401, 403, 405 and 407. Each of the plurality of map tiles 401, 403, 405 and 407 comprises plurality of road segments. And the system 101 may predict the traffic information based on the generated TTI value of the map tile area. In FIG. 4B, there is shown a map tile area 401 with plurality of road segments 409, 411, 413, 415, 417, 421, 423, 425, and 427. As described in FIG. 3A-3B, the system 101 may first obtain probe data and map attributes for each of the road segment 409, 411, 413, 415, 417, 421, 423, 425, and 427 in the map tile area 401. The probe data may be obtained from multiple resources such as mobile devices in the vehicles, or/and one or more sensors installed in the vehicles travelling on road segments. The system 101 may determine the real time traffic condition using the information associated with probe data and map attributes. The current traffic condition data may determine whether a particular road segment on which a vehicle (the vehicle from which the probe data was obtained at a particular moment) is travelling is congested with traffic or traffic is free flow or the speed that is followed by the vehicles on that particular road segment. In an embodiment, the current traffic condition data may also determine how much time is being taken by a vehicle on a particular road segment. And this data is collected from multiple resources and/multiple vehicles in real time. In an example embodiment, if the congestion determined by the current traffic condition is for very small time period then the reason may be signal timings. Similarly if the congestion determined by the current traffic condition is for longer time, the reason may be due to any traffic incident or work zone area.

The system 101 may further obtain historical data associated with each of the plurality of road segments. The system 101 further compare current traffic condition data with the historical data and determine whether current traffic condition data is aligned with historical data or not. The system 101 may aggregate the current traffic condition data and historical data for each road segment using equation (1) to compute the traffic or congestion on each of the plurality of road segment. The system 101 may further generate TTI for the tile based on the aggregated data. The system 101 may further predict the traffic information in the map tile area based on the TTI value.

FIG. 5 illustrates an exemplary representation of traffic information delivery radius generated by the system, in accordance with an example embodiment. The system 101 may determine the location of a vehicle by map-matching the vehicle location on the map and generate traffic information delivery radius data based on the location of the vehicle. The system 101 may further generate traffic information delivery radius based on the generated TTI and traffic information within a radius of location of the vehicle. The radius for the traffic information delivery is based on one or more attributes. The one or more attributes for different traffic information delivery radius may be different types of map areas such as urban (where traffic or congestion is high), rural(where traffic or congestion or frequency of movement of vehicles is very low), different types of functional classes and the like. In an example embodiment, the generated traffic delivery radius is also based on the region in which the vehicle is located. For example, if a vehicle is located in a city or in an urban area and the system 101 may determine that the traffic in the map tile in that location is heavy or congested based on the TTI, then the system 101 may generate the traffic information delivery in radius of 0.5 kms. Similarly, if a vehicle is located in a rural area and the system 101 may determine that the traffic in the map tile in that location is very less as compared to the usual traffic then the system 101 may generate the traffic information delivery in radius of 3 kms or 4 kms which is more as compared to the traffic information delivery in urban area. In an example embodiment, the system 101 may also generate the traffic information delivery using TTI based on different functional classes of roads or different types of road segments.

FIG. 6 illustrates a flow diagram of a method 600 for predicting traffic information for at least one map tile area, in accordance with an example embodiment. It will be understood that each block of the flow diagram of the method 600 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 600 illustrated by the flowchart diagram of FIG. 6 is predicting traffic information for at least one map tile area. Fewer, more, or different steps may be provided.

At step 601, the method comprises obtaining probe data and map attribute data for each of a plurality of road segments in the at least one map tile area. The probe data is obtained by plurality of probe vehicles and map attribute data is obtained from map database 103*a* for each of a plurality of road segments in the at least one map tile area.

At step 603, the method comprises generating current traffic condition data for each of the plurality of road segments in the at least one map tile area based on the obtained probe data and the obtained map attribute data. The system 101 may generate current or real time traffic condition data based on the probe data and map attribute data using traffic engine system. The current traffic condition data is updated as historical data in the map database 103*a*.

At step 605, the method comprises obtaining historical traffic pattern data associated with each of the plurality of road segments in the at least one map tile area. The historical data is obtained from map database 103*a*. The historical data may be associated with but not limited to, congestion or traffic on each of the plurality of road segments in a particular weather condition, in particular hours of a day(for example, office hours, school timings), congestion because of traffic incidents or accidents and the like.

At step 607, the method comprises generating a tile based traffic index (TTI) for the at least one map tile area based on aggregating the current traffic condition data and the historical traffic pattern data of the plurality of road segments in the at least one map tile area. The system 101 further compare and aggregate the current traffic condition data and the historical traffic pattern data to generate TTI. The system 101 may further generate confidence value of the generated TTI.

At step 609, the method comprises providing TTI and predicting the traffic information for the at least one map tile area based on the generated tile based traffic index (TTI). Based on the TTI aggregated value, the system 101 may predict the traffic information in advance and provide the traffic information to the user in advance, and also provide alternative routes to avoid congestion or traffic on all the road segments in a tile.

The method 600 may be implemented using corresponding circuitry. For example, the method 600 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 900.

In an example embodiment, an apparatus for performing the method 600 of FIG. 6 above may comprise a processor (e.g. the processor 201) configured to perform some or each of the operations of the method of FIG. 6 described previously. The processor may, for example, be configured to perform the operations (601-609) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (601-609) may comprise, for example, the processor 201 which may be implemented in the system 101 and/or a device or circuit for executing instructions or executing an algorithm for processing information as described above.

In this way, example embodiments of the invention result predicting traffic information for at least one map tile area based on a TTI value. The prediction of traffic information may forecast the traffic condition for next few hours or few minutes, so that a user can plan accordingly. The invention also provides traffic patterns based on current traffic data and historical data that may provide information to drivers and logistics planners about where they can consistently expect to see slowdowns on the roads. Similarly, the invention assists in finding the fastest way through complex road networks because of traffic patterns. Also, the invention may help government agencies and infrastructure decision-makers to determine what changes can be made on road segments that will impact the flow of traffic at micro and macro levels and take action quickly to avoid the road segment safety risks. The invention may help user to alert while driving based on the traffic condition conditions in a timely and targeted way in advance.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for predicting traffic information for at least one map tile area, the method comprising:
    obtaining probe data from plurality of vehicles over a communication network and map attribute data from a map database over the communication network for each of a plurality of road segments in the at least one map tile area;
    generating, using a traffic engine, current traffic condition data for each of the plurality of road segments in the at least one map tile area based on the obtained probe data and the obtained map attribute data;
    obtaining historical traffic pattern data associated with each of the plurality of road segments in the at least one map tile area;
    generating, using the traffic engine, a tile based traffic index (TTI) for the at least one map tile area based on aggregating the current traffic condition data and the historical traffic pattern data of the plurality of road segments in the at least one map tile area;
    predicting the traffic information for the at least one map tile area based on the generated TTI;
    determining a traffic information delivery radius based on the generated TTI; and
    providing the generated TTI, the traffic information, or a combination thereof to one or more devices over the communication network based on the traffic information delivery radius.

2. The method of claim 1, further comprising generating confidence value for the generated TTI for the at least one map tile area based on a segment confidence value obtained from a map database and a real time traffic speed confidence value obtained from the probe data.

3. The method of claim 1, further comprising:
    determining the location of a vehicle by map matching the vehicle location on the map;
    wherein the traffic information delivery radius data is further based on the location of the vehicle.

4. The method of claim 3, wherein the generated traffic information delivery radius is associated with traffic information within a radius of location of the vehicle.

5. The method of claim 1, wherein generating the tile based traffic index (TTI) for the at least one map tile area comprises generating a numerical value for each of one or more predefined categories, the one or more predefined categories comprising: a way less traffic category, a less traffic category, a similar traffic category, a more traffic category, and a way more traffic than usual category.

6. The method of claim 1, wherein generating the tile based traffic index (TTI) comprises:
    comparing current traffic condition data with historical traffic pattern data for each of the plurality of road segments; and
    generating the tile based traffic index (TTI) based on the comparison of current traffic condition data with historical traffic pattern data for each of the plurality of road segments.

7. The method of claim 1, further comprising updating the historical traffic pattern data based on the current traffic condition data for each of the plurality of road segments in the at least one map tile area.

8. The method of claim 1, further comprises updating a map database with the information associated with the TTI.

9. The method of claim 1, further comprising predicting the traffic information associated with weather data change, traffic and incident change for the at least one map tile area based on generated TTI.

10. A system for predicting traffic information for the at least one map tile area, the system comprising:
    a memory configured to store computer-executable instructions; and
    one or more processors configured to execute the instructions to:
        obtain probe data from plurality of vehicles over a communication network and map attribute data from a map database over the communication network for each of a plurality of road segments in the at least one map tile area;
        generate, using a traffic engine, current traffic condition data for each of the plurality of road segments in the at least one map tile area based on the obtained probe data and the obtained map attribute data for each of the plurality of road segments in the at least one map tile area;
        obtain historical traffic pattern data associated with each of the plurality of road segments in the at least one map tile area;
        obtain weather data associated with each of the plurality of road segments in the at least one map tile area;
        generate, using the traffic engine, a tile based traffic index (TTI) for the at least one map tile area based on aggregation of the current traffic condition data and the historical traffic pattern data of the plurality of road segments in the at least one map tile area; and
        predict the traffic information for the at least one map tile area based on the generated TTI and obtained weather data;
        determine a traffic information delivery radius based on the generated TTI; and
        provide the generated TTI, the traffic information, or a combination thereof to one or more devices over the communication network based on the traffic information delivery radius.

11. The system of claim 10, wherein the one or more processors are further configured to generate a confidence value for the generated TTI for the at least one map tile area based on a segment confidence value obtained from the map database and a real time traffic speed confidence value obtained from the probe data.

12. The system of claim 10, wherein the one or more processors are further configured to:
   determine the location of a vehicle by map matching the vehicle location on the map,
   wherein the traffic information delivery radius data is further based on the location of the vehicle.

13. The system of claim 12, wherein the generated traffic information delivery radius is associated with traffic information within the radius of location of a vehicle.

14. The system of claim 10, wherein to generate the tile based traffic index (TTI), the one or more processors are further configured to generating a numerical value for each of one or more predefined categories, the one or more predefined categories comprising: a way less traffic category, a less traffic category, a similar traffic category, a more traffic category, and a way more traffic than usual category.

15. The system of claim 10, wherein to generate the TTI, the one or more processors are further configured to:
   compare current traffic condition data with historical traffic pattern data for each of the plurality of road segments; and
   generate the tile based traffic index (TTI) based on the comparison of current traffic condition data with historical traffic pattern data for each of the plurality of road segments.

16. The system of claim 10, wherein the one or more processors are further configured to update the map database with the information associated with the TTI.

17. The system of claim 10, further comprises predicting the traffic information associated with weather data change, traffic and incident change for the at least one map tile area based on generated TTI.

18. A computer programmable product comprising a non-transitory computer readable medium having stored thereon computer executable instruction which when executed by one or more processors, cause the one or more processors to carry out operations for predicting traffic information for the at least one map tile area, the operations comprising:
   obtaining probe data from plurality of vehicles over a communication network and map attribute data from a map database over the communication network for each of a plurality of road segments in the at least one map tile area;
   generating, using a traffic engine, current traffic condition data for each of the plurality of road segments in the at least one map tile area based on the obtained probe data and the obtained map attribute data for each of the plurality of road segments in the at least one map tile area;
   obtaining historical traffic pattern data associated with each of the plurality of road segments in the at least one map tile area;
   generating, using a traffic engine, a tile based traffic index (TTI) based on aggregating the current traffic condition data and the historical traffic pattern data of the plurality of road segments in the at least one map tile area;
   predicting the traffic information for the at least one map tile area based on the generated TTI;
   determining a traffic information delivery radius based on the generated TTI; and
   providing the generated TTI, the traffic information, or a combination thereof to one or more devices over the communication network based on the traffic information delivery radius.

* * * * *